(12) United States Patent
Bleil

(10) Patent No.: US 12,145,209 B2
(45) Date of Patent: Nov. 19, 2024

(54) METHOD FOR CUTTING A GEAR, GEAR-CUTTING TOOL AND GEAR-CUTTING MACHINE

(71) Applicant: GLEASON CUTTING TOOLS GMBH, Munich (DE)

(72) Inventor: Nicolas Bleil, Munich (DE)

(73) Assignee: GLEASON CUTTING TOOLS GMBH, Munich (DE)

( * ) Notice: Subject to any disclaimer, the term of this patent is extended or adjusted under 35 U.S.C. 154(b) by 0 days.

(21) Appl. No.: 18/248,709

(22) PCT Filed: Oct. 15, 2021

(86) PCT No.: PCT/EP2021/078690
§ 371 (c)(1),
(2) Date: Apr. 12, 2023

(87) PCT Pub. No.: WO2022/084199
PCT Pub. Date: Apr. 28, 2022

(65) Prior Publication Data
US 2023/0390842 A1 Dec. 7, 2023

(30) Foreign Application Priority Data
Oct. 19, 2020 (DE) .......................... 102020006418.3

(51) Int. Cl.
*B23F 19/05* (2006.01)
*B23F 1/02* (2006.01)
(Continued)

(52) U.S. Cl.
CPC ............ *B23F 19/052* (2013.01); *B23F 1/023* (2013.01); *B23F 5/04* (2013.01); *B23F 21/026* (2013.01)

(58) Field of Classification Search
CPC .......... B23F 12/052; B23F 1/023; B23F 5/04; B23F 21/026
See application file for complete search history.

(56) References Cited

U.S. PATENT DOCUMENTS

| | | | |
|---|---|---|---|
| 2,282,193 A | 5/1942 | Lambrix | |
| 3,368,263 A | 2/1968 | Harris | |
| (Continued) | | | |

FOREIGN PATENT DOCUMENTS

| | | | |
|---|---|---|---|
| DE | 2304398 A1 | 8/1974 | |
| DE | 3707664 C1 | 10/1988 | |
| (Continued) | | | |

OTHER PUBLICATIONS

International Search Report and Written Opinion for PCT/EP2021/078690, ISA/EPO, Feb. 11, 2022, 15 pgs.
(Continued)

*Primary Examiner* — Jacob J Cigna
(74) *Attorney, Agent, or Firm* — Robert L. McDowell

(57) ABSTRACT

Method for cutting a gear (4) from a metal workpiece (2), in which a tooth flank, still having an oversize compared with its predefined final geometry, of the gear is, in one or more cutting passes in cutting engagement with one or more cutting tools (10) fed thereto, hard-fine finished with a geometrically undefined cutting edge made of cutting grains incorporated in a binder matrix, in order to produce a reflective property, existing in the final geometry, of its surface, wherein, in a cutting pass of a cutting tool (10b), both an elastically resilient mounting of the cutting grains set by its binder matrix acts on this surface property, and a cutting reduction of the oversize by at least 2 µm at the tooth flank is realized by a compressive preload, set via the infeed (Continued)

Figure 1:
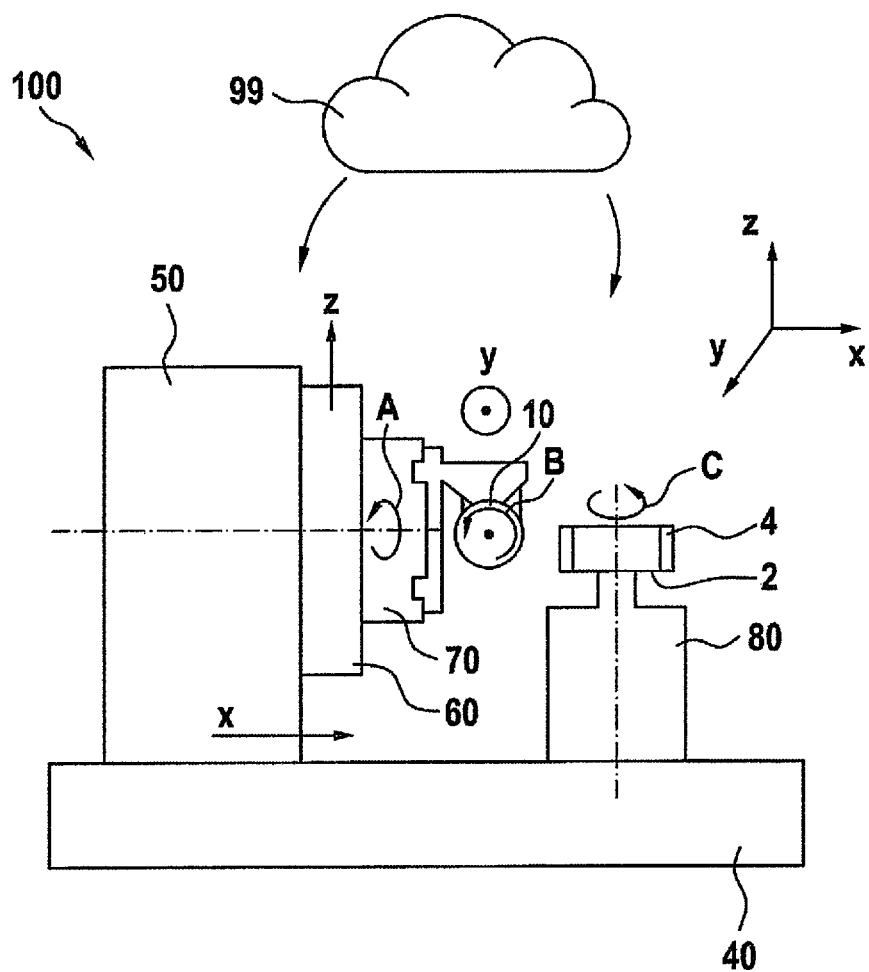

of the cutting tool, to which the cutting engagement is subjected; as well as a gear-cutting tool and a machine tool for this purpose.

12 Claims, 3 Drawing Sheets

(51) Int. Cl.
  *B23F 5/04* (2006.01)
  *B23F 21/02* (2006.01)

(56) References Cited

U.S. PATENT DOCUMENTS

| | | | |
|---|---|---|---|
| 3,623,275 A | 11/1971 | Koella | |
| 3,708,925 A * | 1/1973 | Ainoura | B23F 23/10 |
| | | | 451/541 |
| 4,961,289 A * | 10/1990 | Sulzer | B23F 21/005 |
| | | | 451/253 |
| 5,379,554 A * | 1/1995 | Thurman | B23F 21/005 |
| | | | 451/253 |
| 10,507,538 B2 * | 12/2019 | Mueller | B23F 21/005 |
| 11,407,048 B2 * | 8/2022 | Grinko | B23P 15/14 |

FOREIGN PATENT DOCUMENTS

| | | |
|---|---|---|
| DE | 102016005305 A1 | 2/2017 |
| EP | 0282046 A2 | 9/1988 |
| EP | 3241640 A1 | 8/2017 |

OTHER PUBLICATIONS

Search Report by the German Patent Office for DE 10 2020 006 418.3, Sep. 9, 2021, 10 pgs.

* cited by examiner a)

b)

METHOD FOR CUTTING A GEAR, GEAR-CUTTING TOOL AND GEAR-CUTTING MACHINE

The invention relates to a method for cutting a gear from a metal workpiece—in particular, in continuous generating grinding—in which a tooth flank, still having an oversize compared with its predefined final geometry, of the gear is, in one or more culling passes in cutting engagement with one or more cutting tools fed thereto, hard-fine finished with a geometrically undefined cutting edge made of cutting grains incorporated in a binder matrix, in order to produce a reflective property, existing in the final geometry, of its surface; a gear-cutting tool designed for this purpose; and a gear-cutting machine designed for this purpose.

If gears with a predetermined end geometry (target dimension) are to be produced, an oversize is left compared to the final geometry when, for example, cutting gears in the soft-cutting process, which then, after hardening the gear, has to be removed by means of hard/fine finishing. The hard/fine finishing can in turn be carried out by cutting with a geometrically defined cutting edge (for example, by hard peeling), or with a geometrically undefined cutting edge by grinding processes such as profile grinding, generating grinding, or scraping (tooth-honing).

For typical applications, such as for gear wheels in the automotive industry, the oversize that is still to be removed can be 0.1 mm, i.e., approximately 100 µm, and is removed using the known technique in several cutting passes in a deeper infeed in each case via one or more roughening passes in which the majority of the oversize is removed, and then one or more finishing passes in which the residual oversize still remaining after the roughening is removed to the final geometry. For example, for the above example of an oversize of 100 µm, 90 µm of oversize can be removed in a roughening pass, and the remaining 10 µm is removed in a finishing pass.

For both roughening and finishing, a ceramic bond is usually used to achieve the desired stiffness of the employed cutting tool, e.g., a grinding worm for generating grinding; with regard to the abrasive, abrasive grains made of corundum or sintered corundum are often used—not least for cost reasons.

In addition, tooth flank modifications such as crownings or constrictions can also be introduced by the grinding. It is possible to use dressable and non-dressable grinding tools. All of this is known to the person skilled in the art and is described, for example, in Thomas Bausch, Innovative Zahnradfertigung, 3rd edition, Expert Verlag.

With the combination of roughening and finishing passes explained above, surfaces of the gear with a roughness depth $R_z$ can be produced within a range of approximately up to 2.5 µm (with arithmetic mean roughness values $R_a$ within a range of about 0.3 to 0.6 µm). The surface after such cutting and with these roughness values appears matte. On the part of users, however, there are increased demands for higher surface qualities in the sense of lower surface roughnesses which extend as far as the surface appearing reflective.

In order to achieve these further requirements, the gears already prepared by roughening and finishing are subjected to polishing cutting, which essentially polishes the gear surface only to lower roughness values. Such a type of method was presented, for example, by the company Reishauer at the WZL Fine Machining Seminar 2015 as polishing grinding using an elastic bond in a grinding worm region which is carried out immediately after conventional grinding cutting without interruption of the cutting process, and has only the task of reducing the tip height of the roughness profile without changing the flank topography of the tooth flanks in the active region. For this polishing grinding, a roughness profile according to DIN4768 with an $R_z$ of 0.73 µm and $R_a$ of 0.08 µm is specified as achievable.

As a further method principle, a so-called fine grinding stage was proposed in the context of the same presentation, for which both the tip height and the groove depth of the roughness profile are mostly reduced with grinding worms with a ceramic bond by using a finer grinding wheel grain without changing the flank topography of the gear flanks in the active region. This fine grinding can be performed in the finishing stage or in an additional cutting stage immediately following conventional grinding without interrupting the cutting process, but a roughness profile is achieved with only an $R_z$ of 1.35 µm and an $R_a$ of 0.21 µm, and therefore not the roughness parameters of a user-specified target of an $R_z$ less than 1 µm and an $R_a$ less than 0.1 µm. The above option of polishing grinding proposed by Reishauer achieves a significant improvement in the functional properties of the gear with comparatively little effort. The reflective gear surface after polishing is also readily discernible on the presented exemplary workpieces. For both polishing and fine grinding, it is stated that the change in surface finish is time-additive.

The invention is based upon the object of further developing a method of the type described above with regard to a satisfactory compromise between gear surface quality and process control.

This object is achieved by the invention by a method of the type mentioned above, which is basically characterized in that, in a cutting pass of a cutting tool, both an elastically resilient mounting of the cutting grains set by its binder matrix acts on this surface property, and a cuffing reduction of the oversize by at least 2 µm at the tooth flank is realized by a compressive preload, set via the infeed of the cutting tool, to which the cutting engagement is subjected.

The invention is based upon the insight that achieving satisfactory surface properties on the one hand and advantages for the cutting itself on the other can be achieved in that, despite the surface properties to be achieved and the elastically resilient mounting of the cutting grains set for this purpose by the binder matrix, a cutting reduction of the oversize can still be achieved on the tooth flank by setting a compressive preload via the infeed of the cutting tool. For various applications, this makes it possible to perform this cutting pass directly after (also after only) one roughening pass, so that, in particular, a finishing pass can be omitted, and shorter cycle times can therefore be achieved, as will be explained in more detail below.

Within the meaning of this disclosure, a reflective property of the surface exists, given an average roughness depth $R_Z$ of 1.35 µm or less. With the cutting reduction of the oversize according to the invention by at least 2 µm, the border between the core area and the profile groove area according to ISO13565 of the roughness profile of the tooth flank surface machined by the cutting tool with an elastically resilient mounting of the cutting grains is exceeded during removal. Therefore, not only are the tips of the profile broken, but, substantially, the previous roughness profile before the cutting reduction of the oversize is eliminated and replaced by a newly-generated roughness profile which has the reflective property after cutting with this cutting tool. In another preferred embodiment, the cutting oversize reduction still removes more than one-third of the profile groove region, and more preferably more than two-thirds of this region. It is also provided that the profile groove region be almost completely or even completely removed.

In this context, in a particularly preferred method design, more than 3 μm, preferably more than 4 μm, and in particular more than 5 μm, oversize is removed in this cutting pass, and/or less than 12 μm, preferably less than 10 μm, and in particular less than 8 μm. On the one hand, this allows less sensitivity in the prior execution of a roughening operation in particular. On the other hand, damaging influences due to excessive compressive preloads are avoided by not removing too much oversize.

The pressure preload can be achieved by setting the machine axis setting for, for example, a higher radial infeed of the tool to the workpiece than a comparative setting that would be used to achieve the desired oversize removal in the case of a more inflexible tool (setting to negative oversize). For example, for the reference to which the following values refer, the grinding worm can be used with which a prior oversize removal is carried out before the cutting pass of the cutting tool with the elastically resilient mounting of the cutting grains. Preferably, such an overfeed of at least 20 μm, preferably at least 28 μm, and in particular at least 36 μm, and/or of at most 100 μm, preferably at most 90 μm, in particular at most 80 μm, and in particular more preferably at most 70 μm, is set, converted to such a reference-related radial overfeed of a machine axis. Absolute numerical values of the radial overfeed can vary from machine tool to machine tool, since their elastic flexibility must be taken into account. These must be determined for the first time before initial use with a given machine configuration and workpiece configuration for the employed cutting tool with the elastically resilient mounting of the cutting grains, or accordingly retrieved from data records in which these values are stored from experimental tests or precise numerical simulations.

With regard to the cutting grains or abrasive grains, a Knoop hardness (in $N/mm^2$) of more than 23,000, preferably more than 25,000, and in particular more than 27,000 is preferred. This ensures good cutting performance. If individual cutting grains fracture, "fresh" cutting edges also arise again, so that, overall, a satisfactory durability of the tools is achieved, and, in particular, the cutting work performed until the next required dressing is satisfactory.

With regard to the cutting grains or abrasive grains, silicon carbide (SiC)—in particular, green or black—is preferred as a component, and in particular a predominant component. Grain blends with preferably at least 30%, more preferably at least 50%, and in particular at least 70% SiC are also considered—especially with corundum/sintered corundum as a further blend component.

Preferred grain sizes for the employed abrasive grain are within a range of greater than 5.5 μm, in particular greater than 7.5 μm, and more preferably greater than 8.5 μm, but, on the other hand, it is preferable for them to be less than 18 μm, preferably 16 μm, and in particular 14 μm. According to FEPA (Federation of European Producers of Abrasives) regulations, an abrasive grain size of 9.4 μm, for example, corresponds to a mesh fineness of the sieve of 600 mesh, and an abrasive grain size of 6.5 μm corresponds to a mesh of 800.

In terms of materials, it is preferred that the elastic adjustment include a material selection for the binder matrix as a plastic material or a rubber material, and in particular polyurethane.

The elasticity of the cutting tool with the elastically resilient mounting of the cutting grains therefore moves within a range in which, on the one hand, a walk effect is still possible, and, on the other, the cutting minimum oversize reduction according to the invention takes place. In this context, it is particularly preferable that the modulus of elasticity (Young's modulus) of the cutting tool measured in GPa be less than 20.0, preferably less than 18.5, and in particular less than 17.0, and/or greater than 10.0, preferably greater than 11.5, and in particular greater than 13.0. The modulus of elasticity can be determined as part of a sonic measurement, as is already used for gear-cutting tools in quality inspection, e.g., with measuring systems from GrindoSonic®. For this purpose, the tool, which is supported by a three-point or four-point bearing, for example, is vibrated by an exciter, and the modulus of elasticity is determined at a known density of the tool by a sensor that detects the frequency response of the tool to the excitation (in tool inspections, this technique is used to detect damage to the tool in the event of suppression of higher frequencies). The above values refer to the employed tool for this cutting pass (and only to it). If a combination tool is provided which is designed in one area for the cutting pass and in a related area for roughening, for example, and is equipped with a ceramic bond for this purpose, a measurement of the combination tool contrastingly yields correspondingly higher values of the modulus of elasticity of the overall bond approaching 30 GPa, corresponding to usual modulus of elasticity values of ceramic-bonded grinding tools of about 34 GPa. Pure polishing tools, on the other hand, have a modulus of elasticity of only about 10 GPa to even less than 5 GPa, depending upon their intended use.

It is therefore provided that tools be used that are softer than the ceramic bonds normally used for roughening and finishing; however, on the other hand, harder tools are used than those intended purely for polishing tasks.

With regard to the surface roughness of the average roughness depth ($R_z$), a value measured in μm of less than 1.2, preferably less than 1.1, more preferably less than 1.0 μm, and in particular less than 0.9 can be achieved and provided after this cutting pass, and values of less than 0.12, and in particular less than 0.10, are provided for the arithmetic mean roughness $R_a$. It was even possible to achieve values of less than 0.08 (see below). Furthermore, it is preferred that the sum of core roughness depth $R_k$ and reduced peak height $R_{pk}$, which can be determined (via the Abbott curve), be less than 0.6 μm, even 0.5 μm, or even 0.4 μm. For the reduced groove depth $R_{vk}$, values not greater than the order of magnitude of this sum are preferred, but $R_{vk}$ values approaching or exceeding 50% of the core groove depth $R_k$ are certainly envisaged.

It is preferably provided that the cutting speed ($v_c$) measured in m/s of this cutting pass be greater than 42, preferably 45, and in particular 48, and/or be less than 80, preferably less than 72, and in particular 66.

As already mentioned above, in a particularly preferred method design, it is provided that the cutting pass discussed so far be a subsequent cutting pass which is preceded by a cutting operation—in particular, rough cutting—which reduces the oversize by a total of more than 30 μm, preferably more than 50 μm, and in particular more than 70 μm. In this context, it is preferably also provided that the prior cutting comprise at most two cutting passes, and in particular only one cutting pass. In the latter of the preferably provided variants, two cutting passes are therefor sufficient, one roughening cutting pass which in this case removes the total oversize of preferably more than 50 μm or more down to the oversize left for the cutting pass of the elastic mounting and compressive preload. There are then considerable cycle time savings from completely omitting the usual finishing pass.

The variant with two (rough) cutting passes is preferably used when the total oversize to be removed is more than 80 µm, more than 90 µm, or even more than 100 µm, and/or strong asymmetries in the hardened preliminary gear exist. In this case, an at least approximately equal removal load is in principle preferably provided for both roughening passes; in any case, each of the cutting passes should preferably remove more than 30 µm, and in particular more than 40 µm, oversize. Here, too, cycle time can be saved by omitting the finishing step, which is usually run more slowly.

In particular, with low quality of the preliminary gear transferred to hard finishing, such as a concentricity error and/or a total pitch error of (respectively) more than 60% or even more than 65%, and in particular even more than 70% of the total oversize q, it is also possible, when two cutting passes are performed before the cutting pass with the cutting tool with the elastically resilient mounting of the cutting grains, to provide for a more asymmetrical distribution of the removal between the first and the second of these preceding passes, with lesser removal in the second of the preceding cutting passes. In a possible embodiment, for example, an asymmetry factor $\Delta q/q$ (with $\Delta q=|q_1-q_2|$ and $q=|q_1+q_2|$) and $q_1$, $q_2$ removal in the first or second pass equal to or less than g2 could be assumed for an averaged roughness depth $R_Z$ of the surface obtained (to be obtained) after treatment with the cutting tool with elastically resilient mounting of the cutting grains, where:

$$g2=0.6-[2/(5\pi)]\arctan[k(R_Z[\mu m]-R_0)],$$

with $k=80$, $R_0=1.2$, preferably $R_0=1.15$, more preferably $R_0=1.1$, even more preferably $R_0=1.05$, and in particular $R_0=1.0$. Alternatively or additionally, it is preferred that the ratio be $\Delta q/q \geq g1$, with $$g1=\beta[1-H(R_Z[\mu m]-R'_0)]$$

with $R'_0=1.0$, preferably 1.05, and in particular 1.1, and $\beta=0.4$, preferably 0.5, and in particular 0.6, and the Heaviside function $H(x)$.

For typical applications of hobbed gears in the module range of less than 6 and gear widths up to 150 mm, correspondingly low cutting times can therefore be achieved in the preferred variant of only a total of two cutting passes; in the method design with two passes and the cutting pass of the elastically resilient mounting, satisfactory cutting times for achieving the desired surface properties in the final geometry can always be achieved, which are still in any case not higher than with conventional processes.

In this context, a ratio of the feed rate for the subsequent cutting pass to the feed rate of the preceding pass of more than 1.4, preferably more than 2, in particular more than 2.5, and even more than 3, is preferably set. Even a ratio of 4 or higher is conceivable. For conditioning the grinding tool, the usual dressing systems consisting of forming and profiling rollers are available. Flexible, tool-specific, or even multi-rib dressing tools should also be mentioned. Toothed or radius dressers can also be used. In this case, the duration of conditioning can be analogous to a usual grinding process consisting of a combination of roughening and finishing strokes.

Furthermore, the invention covers a suitably designed, preferably dressable, gear-cutting tool for carrying out the method according to the invention, which can in particular have at least two cutting areas, at least one of which is provided for the preceding cutting, and another for the subsequent cutting. These can be connected axially one behind the other and, in particular, secure against rotation. Particularly preferably, the tool design is that of a grinding worm designed for continuous generating grinding and, for other cutting processes, of course, the appropriate tool design.

In addition, the invention covers a machine tool for cutting a gear of a metallic workpiece, which tool is equipped with a control device for carrying out the method according to the invention, and/or a correspondingly designed gear-cutting tool—in particular, a grinding worm.

Figure 2:
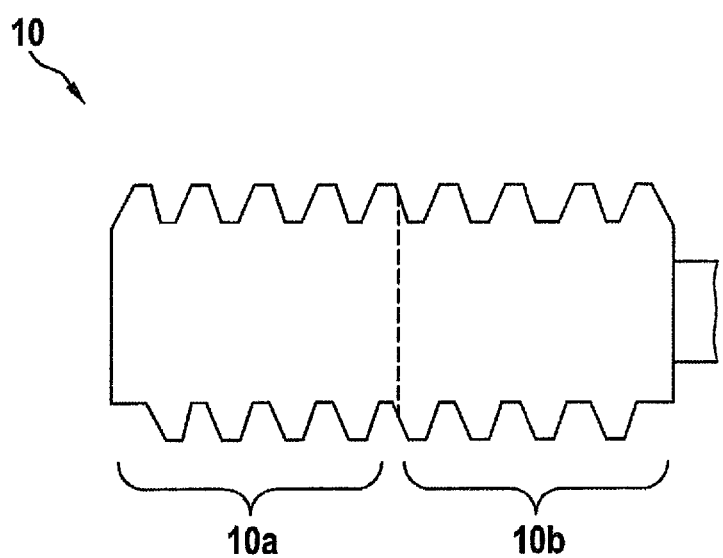
Figure 3:
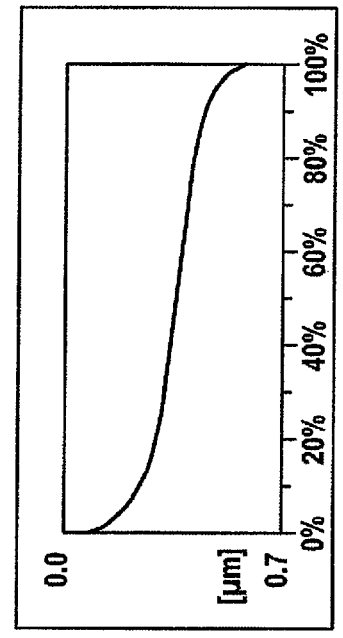
Figure 3:
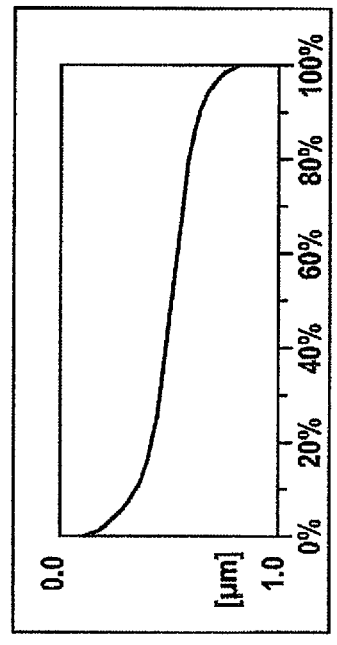

Further features, details, and advantages of the invention will be apparent from the following description with reference to the accompanying figures, of which FIG. 1 schematically shows a generating grinding machine, FIG. 2 schematically shows an axial section through a worm-shaped tool, and FIG. 3a, b shows Abbott curves of two gears to be cut.

An exemplary embodiment of the invention is further explained below for continuous generating grinding. A rolling grinding machine which can be used for this purpose has, in terms of the workpiece, a workpiece spindle or table spindle 80, mounted in a machine bed 40, on which a workpiece wheel 2 is clamped which is already pre-toothed and has a gear 4. The type of the workpiece wheel 2 and the gear 4 is not limited any further; a cylindrical wheel is shown, but the invention is not restricted thereto, and other types of gears could also be cut. In the case of undulating workpieces, a tailstock (not shown in FIG. 1) can be provided for this purpose.

In terms of the tool, a carriage assembly is provided which holds and can position the cutting tool 10 in the form of a grinding worm. Specifically, as in FIG. 1, three linear movement axes X, Y, and Z could be provided which can adjust the relative position of the tool 10 with respect to the workpiece wheel 2 by CNC-controlled machine axis movements from a controller 99.

A linear carriage 50 is provided for a radial (X) feed movement. The latter carries a vertical carriage 60 for a machine axis Z running parallel to the workpiece axis of rotation C. Another carrier 70 is rotatably arranged in relation to the vertical carriage 60; the swiveling takes place in this case and the X-axis direction (swiveling axis A). The carrier 70 also includes a tangential carriage (Y-axis) with which the tool 10 can be displaced along the tool axis of rotation. In the situation shown in FIG. 1 with pivot angle A=0, the tool axis of rotation runs in the Y direction of the rectangular coordinate system X, Y, Z shown in FIG. 1. The axis of rotation of the tool about its own axis is identified as the axis of rotation with B, and the workpiece axis of rotation is identified as the axis of rotation with C.

As far as described, the design can therefore be a known structure of a generating grinding machine, and correspondingly, other constructive designs and machine axis distributions can be alternatively provided.

The worm-shaped tool 10 shown schematically in FIG. 2 is a combination tool with two coaxial sections 10a and 10b that are connected in a rotationally-fixed manner in this exemplary embodiment. In this exemplary embodiment, section 10a is a grinding worm designed for the roughening of gears in a continuous generating grinding method—in particular, with ceramic bonding—as is also well known from the prior art. In this exemplary embodiment, the other section 10b is also a worm-shaped tool that can be, and is here, similar to section 10a-particularly with respect to the worm parameters. The width of 10b corresponds to a minimum of the engagement width between tool 10 and gearwheel 4, and a maximum of half the grinding wheel width (10a=10b)—frequently within a range of 60 mm.

In this exemplary embodiment, the modulus of elasticity of section 10b is 13.6 GPa when measured alone. In addition, in the present exemplary embodiment, the binding matrix is formed from a polyurethane material, and the abrasive grains are of green silicon carbide. As will be explained in more detail below, the section 10b of the screw 10 serves to bring a roughened gear 4, without an intermediate finishing pass (which is usually carried out, for example, with section 10a of the worm 10) to remove material, to the final geometry with the desired surface properties.

For this purpose, the oversize relative to the final geometry is first removed in one or more roughening passes up to a residual oversize of, for example, 6 μm in this embodiment. This residual oversize is therefore quite lower than is usually left during roughening for a subsequent finishing pass (typically, the finishing process is responsible for a material removal of approximately 20 μm). Subsequently, the worm section 10b is used without carrying out a finishing pass, in order to remove the remaining residual oversize to the final geometry in this exemplary embodiment in only one cutting pass. With a higher radial (X) infeed than required to achieve the final geometry by means of a non-resilient tool such as section 10a, the worm section 10b is brought into a cutting engagement of continuous generating grinding with the gear 4. Due to the combination of the worm section 10b, which is designed to be resilient in this way, with the preload set to a negative oversize, material is nevertheless removed only down to final geometry, because of the resilient nature of the tool section 10b, simultaneously with a high surface quality. In addition, due to the cutting tool that is still harder, compared to pure polishing, significantly more material removal results in comparison to conventional polishing.

Two specific exemplary embodiments are described below.

In a first embodiment, a gearwheel with a 3 mm module, 22 teeth, and an engagement angle of 20°, which is helically toothed with a helix angle of 20°, is ground. The gearing width in this embodiment is 34 mm. The outer diameter and root circle diameter of the exemplary embodiment are 76.77 mm and 62.50 mm, respectively. The pre-cutting dimension before hard-fine finishing as a diametrical, two-ball dimension with a measuring ball diameter of 6 mm is 81.150 mm, and the final dimension corresponding to the final geometry is 80.605 mm, resulting in an oversize per flank of 125 μm.

The grinding tool is a two-component tool as shown in FIG. 2—a three-start grinding worm with an engagement angle of 20° in this embodiment.

The cutting speed was set to 50 m/s, and the cutting strategy is one with three grinding strokes, of which two roughening strokes with worm region 10a and a final pass with worm region 10b were used.

In this specific exemplary embodiment, the radial infeed was initially 0.237 mm in the first roughening pass, and then 0.179 mm in the second roughening pass. The radial infeed set for the machine in the third cutting pass is still 0.070 mm. The nominal material removal rate $Q_w$ in [mm³/s] in the order of the strokes was 65.5; 43.7, and 43.4; at an infeed also in that order, 0.273; 0.241, and finally 0.846 mm per workpiece revolution. Relatively speaking, the infeed is therefore significantly higher in the last cutting pass than in the preceding roughening passes. This therefore allows overall short cutting times and, correspondingly, significantly better cycle times than conventional methods in which, after the roughening, another finishing pass is first interposed.

Measurements of the surface quality of the gear 4 machined in this way were carried out using a Hommel-Etamic Turbowave V 7.60 (probe TKU 300, measuring range 400 μm, scanning distance Lt 4.80 mm, speed (Vt) 0.5 mm/s, recording 24,000 measured values with a filter P-R-W profile according to ISO 11562 with $L_c$ (cut off) of 0.800 mm with $L_c/L_s$:OFF probe:r=5 μm/90°).

The curve shown in FIG. 3a (right flank) was determined for the material section R-profile (Abbott curve); surface characteristic values were $R_a$=0.09 μm, $R_z$=0.71 μm.

In a second exemplary embodiment, a two-stroke strategy was used—one stroke each with worm sections 10a and 10b. The gear data in this case were a 1.275 mm module with 36 teeth, engagement angle of 18°, helix angle of −22° with a gearing width of 16.6 mm, outer diameter of 51.98 mm, and root circle diameter of 45.40 mm.

Here, a pre-cutting dimension (in diametrical, two-ball dimension $M_{dk}$ with measuring ball diameter of 2.5 mm) of 53.803 mm was removed to a finished dimension of 53.275 mm (corresponds to an oversize per flank of 0.099 mm). The tool used here was a five-start grinding worm with an angle of engagement of 18°; the cutting speed was unchanged compared to the first exemplary embodiment.

Other process parameters set in strokes 1 and 2 were a machine axis setting for the radial infeed of 0.306 mm and 0.065 mm, respectively, and the feed per workpiece revolution was 0.227 and 0.948 mm, respectively, with a nominal material removal rate of 45 or 40 mm³/s.

The tooth system processed in this way was also measured, with changed measurement parameters with regard to the sensing distance of 1.50 mm and speed of 0.15 mm/s and $L_c$ 0.250 mm.

In this way, a value of 0.07 μm was determined for $R_a$, and a value of 0.51 μm for $R_z$. The Abbott curve, again for the right flank, is shown in FIG. 3b. In addition, a core roughness depth $R_k$ of 0.22 μm and reduced tip height of 0.08 μm and a reduced groove depth $R_{vk}$ of 0.11 μm were determined.

In both exemplary embodiments, the user-desired surface qualities could therefore be achieved and even exceeded, with nevertheless favorable cutting times by dispensing with the usual finishing pass by the pre-cutting tool, preferably with a ceramic bond (worm section 10a).

Moreover, the invention is not limited to the exemplary embodiments explicitly portrayed in the preceding description. Rather, the individual features of the foregoing description and of the claims below may, individually and in combination, be essential to the implementation of the invention in its various embodiments.

Although the invention has been described in more detail in specific embodiments of continuous generating grinding, the process mechanisms and features described in the introduction can also be applied to other hard-fine finishing methods of gears.

The tools for roughening and cutting with resilient mounting and a compressive preload do not have to be realized by a combination tool as shown in FIG. 2; separate tools could also be used which are clamped together in a grinding head, or they could also be provided in separate grinding heads, just as other grinding machine configurations can be used as shown in FIG. 1.

The invention claimed is:

1. Method for cutting a gear (4) from a metal workpiece (2) in which a tooth flank, still having an oversize compared with its predefined final geometry, of the gear (4) is, in one or more cutting passes in cutting engagement with one or more cutting tools (10) fed thereto, hard-fine finished with a geometrically undefined cutting edge made of cutting grains incorporated in a binder matrix, in order to produce a reflective property, existing in the final geometry, of the surface of the tooth flank, characterized in that, in a cutting pass of a cutting tool (10b), both an elastically resilient mounting of the cutting grains set by its binder matrix acts on the surface property of the tooth flank, and a cutting reduction of the oversize by at least 2 μm at the tooth flank is realized by a compressive preload, set via the infeed of the cutting tool, to which the cutting engagement is subjected, wherein the compressive preload is effected by a radial overfeed of at least 20 μm and/or at most 100 μm corresponding as a reference-related, negative oversize beyond the final geometry.

2. Method according to claim 1, wherein, in the cutting pass of the cutting tool (10b), more than 3 μm and/or less than 12 μm oversize is removed.

3. Method according to claim 1 wherein, for the modulus of elasticity of the cutting tool (10b), a value, measured in GPa, of less than 20.0 and/or greater than 10.0 is used.

4. Method according to claim 1 wherein the cutting grains of the cutting pass of cutting tool (10b) have a Knoop hardness in N/mm² of more than 23,000.

5. Method according to claim 1 wherein the cutting speed ($v_c$) measured in m/s of the cutting pass of cutting tool (10b) is greater than 42 and/or is less than 80.

6. Method according to claim 1 wherein the grain sizes of the cutting grains are within a range of greater than 5.5 μm and/or the grain size is less than 18 μm.

7. Method according to claim 1 wherein an average roughness depth ($R_z$) indicated in μm of the surface after the cutting pass of cutting tool (10b) is less than 1.2.

8. Method of claim 1 comprising continuous generating grinding.

9. Method according to claim 1 wherein the cutting tool (10b) includes a material selection for the binder matrix as a plastic material or a rubber material.

10. Method of claim 9 wherein the material selection for the binder matrix comprises polyurethane.

11. Method according to claim 1 wherein said cutting pass of cutting tool (10b) is a subsequent cutting pass immediately preceded by a cutting operation which reduces the oversize by a total of more than 30 μm in one or more cutting passes.

12. Method according to claim 11, wherein the prior cutting comprises at most two cutting passes.

* * * * *